US006581468B2

(12) United States Patent
Clifford (10) Patent No.: US 6,581,468 B2
(45) Date of Patent: Jun. 24, 2003

(54) INDEPENDENT-EXCITATION CROSS-COUPLED DIFFERENTIAL-PRESSURE TRANSDUCER

(75) Inventor: Mark J. Clifford, Moorpark, CA (US)

(73) Assignee: Kavlico Corporation, Moorpark, CA (US)

(*) Notice: Subject to any disclaimer, the term of this patent is extended or adjusted under 35 U.S.C. 154(b) by 0 days.

(21) Appl. No.: 09/815,094

(22) Filed: Mar. 22, 2001

(65) Prior Publication Data
US 2002/0134163 A1 Sep. 26, 2002

(51) Int. Cl.[7] .................................................. G01L 7/08
(52) U.S. Cl. ........................ 73/715; 73/717; 73/719; 73/716
(58) Field of Search .................... 73/715, 718, 719, 73/438, 700 T (56) References Cited

U.S. PATENT DOCUMENTS

| 2,361,173 A | 10/1944 | Browne et al. |
| 2,815,480 A | 12/1957 | Ruge |
| 2,844,027 A | 7/1958 | Davie |
| 2,846,646 A | 8/1958 | Van Santen |
| 2,871,698 A | 2/1959 | Bagby |
| 3,269,187 A | 8/1966 | Perino |
| 3,702,401 A | 11/1972 | Parkin |
| 4,013,949 A | 3/1977 | Ice |
| 4,023,562 A | 5/1977 | Hynecek et al. |
| 4,131,088 A * | 12/1978 | Reddy ...................... 73/719 |
| 4,196,382 A | 4/1980 | Bryzek |
| 4,222,277 A | 9/1980 | Kurtz et al. |
| 4,287,501 A | 9/1981 | Tominaga et al. |
| 4,291,293 A | 9/1981 | Yamada et al. |
| 4,295,115 A | 10/1981 | Takahashi et al. |
| 4,404,539 A | 9/1983 | Yamada et al. |
| 4,565,097 A | 1/1986 | Dimeff |
| 4,667,516 A | 5/1987 | Schulz |
| 4,670,969 A | 6/1987 | Yamada et al. |
| 4,672,974 A | 6/1987 | Lee |
| 4,790,192 A | 12/1988 | Knecht et al. |
| 4,798,093 A | 1/1989 | Kenoun |
| 4,802,952 A | 2/1989 | Kobori et al. |
| 4,895,026 A | 1/1990 | Tada |
| 4,958,520 A | 9/1990 | Trommler et al. |
| 4,975,390 A | 12/1990 | Fujii et al. |
| 5,031,461 A | 7/1991 | Baskett |
| 5,193,393 A | 3/1993 | Czarnocki |
| 5,471,884 A | 12/1995 | Czarnocki et al. |
| 5,576,251 A | 11/1996 | Garabedian et al. |
| 5,578,843 A | 11/1996 | Garabedian et al. |
| 5,591,679 A | 1/1997 | Jakobsen et al. |
| 5,877,423 A | 3/1999 | Mattsson |
| 5,923,952 A | 7/1999 | Ismail et al. |
| 5,929,498 A | 7/1999 | Ismail et al. |
| 5,966,617 A | 10/1999 | Ismail |
| 6,008,113 A | 12/1999 | Ismail et al. |
| 6,023,978 A * | 2/2000 | Dauenhauer et al. ......... 73/720 |
| 6,150,917 A | 11/2000 | Meyer et al. |

FOREIGN PATENT DOCUMENTS

| DE | 42 27 893 A1 | 4/1993 |
| WO | WO 96/01414 | 1/1996 |

* cited by examiner

Primary Examiner—Hezron Williams
Assistant Examiner—Jermaine Jenkins
(74) Attorney, Agent, or Firm—Oppenheimer Wolff & Donnelly LLP (57) ABSTRACT

The present invention provides a differential-pressure transducer having two sensors cross-coupled and independently excited. A first Wheatstone Bridge pressure sensor has a first sensitivity and is excited by a first voltage. A second Wheatstone Bridge pressure sensor has a second sensitivity and is independently excited by a second voltage different from said first voltage. The excitation voltages are independently adjusted to increase or decrease the sensitivities of the sensors to substantially match. The outputs of the sensors are cross-coupled to each other to reduce the offset difference errors between the pressure sensors. Sensitive electronics are isolated within the sealed housing to protect them from harsh surrounding media. The transducer is configured to provide either a four pressure differential pressure measurement or a three pressure gauge differential pressure measurement.

25 Claims, 6 Drawing Sheets

INDEPENDENT-EXCITATION CROSS-COUPLED DIFFERENTIAL-PRESSURE TRANSDUCER

RELATED APPLICATIONS

The present invention is related to U.S. patent application Ser. No. 09/704,376 filed on Nov. 2, 2000 by the present inventor which is incorporated by reference in its entirety into the present disclosure.

BACKGROUND OF THE INVENTION

1. Field of the Invention

The present invention relates to a pressure transducer, and more particularly to a differential-pressure transducer having two sensors cross-coupled and independently excited.

2. General Background and State of the Art

Differential pressure sensors are used to measure pressure differences between two pressure sources. It is known to use separate Wheatstone Bridge arrangements of interconnected resistances as the pressure sensors for measuring each of the two pressure sources. Ideally, in order to provide an accurate differential pressure measurement, the output voltage versus pressure characteristics for each of the bridge pressure sensors should be similar and should remain similar despite factors such as changing temperature and acceleration. U.S. Pat. No. 6,023,978 to Dauenhauer et al. electrically cross-couples the bridge pressure sensors to compensate for temperature and acceleration induced errors. However, Dauenhauer suffers from the disadvantage of requiring that the two sensors have substantially similar or substantially identical error characteristics in order for the cross-coupling to compensate for errors. In practice it is difficult to find sensors with such closely matching error characteristics. This results in reduced accuracy when using a design such as described by Dauenhauer. It would be desirable to provide compensation for the sensors so that they do not need to have substantially similar or substantially identical error characteristics for use as differential pressure sensors.

One important application for differential pressure sensors is in the automobile industry, where they are used to measure the pressure difference between an engine's exhaust and intake manifolds. In such applications, the sensors are exposed to harsh contaminants. It is desirable to isolate the sensor from the surrounding contaminants while still accurately measuring pressure. U.S. Pat. No. 6,023,978 to Dauenhauer does provide isolation for the pressure sensors used in a differential pressure sensor layout, but in a rather bulky package. It would be desirable to isolate the sensors from harsh contaminants by enclosing them in a compact package.

INVENTION SUMMARY

A general object of the present invention is to provide a differential pressure transducer that will provide accurate differential pressure measurements over a range of pressures and temperatures. Another objective is to protect the electronics from contaminants while packaging the transducer within a compact housing. These goals are achieved by the present invention comprising a first pressure sensor having a first sensitivity and excited by a first voltage, a second pressure sensor having a second sensitivity different from the first sensitivity and excited by a second voltage different from the first voltage, and wherein the first and second voltages are independently adjustable to increase or decrease the sensitivities of the first and second sensors to substantially match each other, and wherein the outputs of the sensors are cross-coupled to each other to reduce the offset difference errors between the pressure sensors.

These goals are also achieved by a method for matching the output characteristics of a first and a second pressure sensor comprising the steps of, applying a first excitation to the first pressure sensor, applying a second excitation different than said first excitation to the second pressure sensor, independently adjusting the first and second excitations to increase or decrease the sensitivities of the first and second sensors to substantially match each other, and cross-coupling the outputs of the sensors to reduce the offset difference errors between the pressure sensors.

DETAILED DESCRIPTION OF THE PREFERRED EMBODIMENTS

Figure 1:
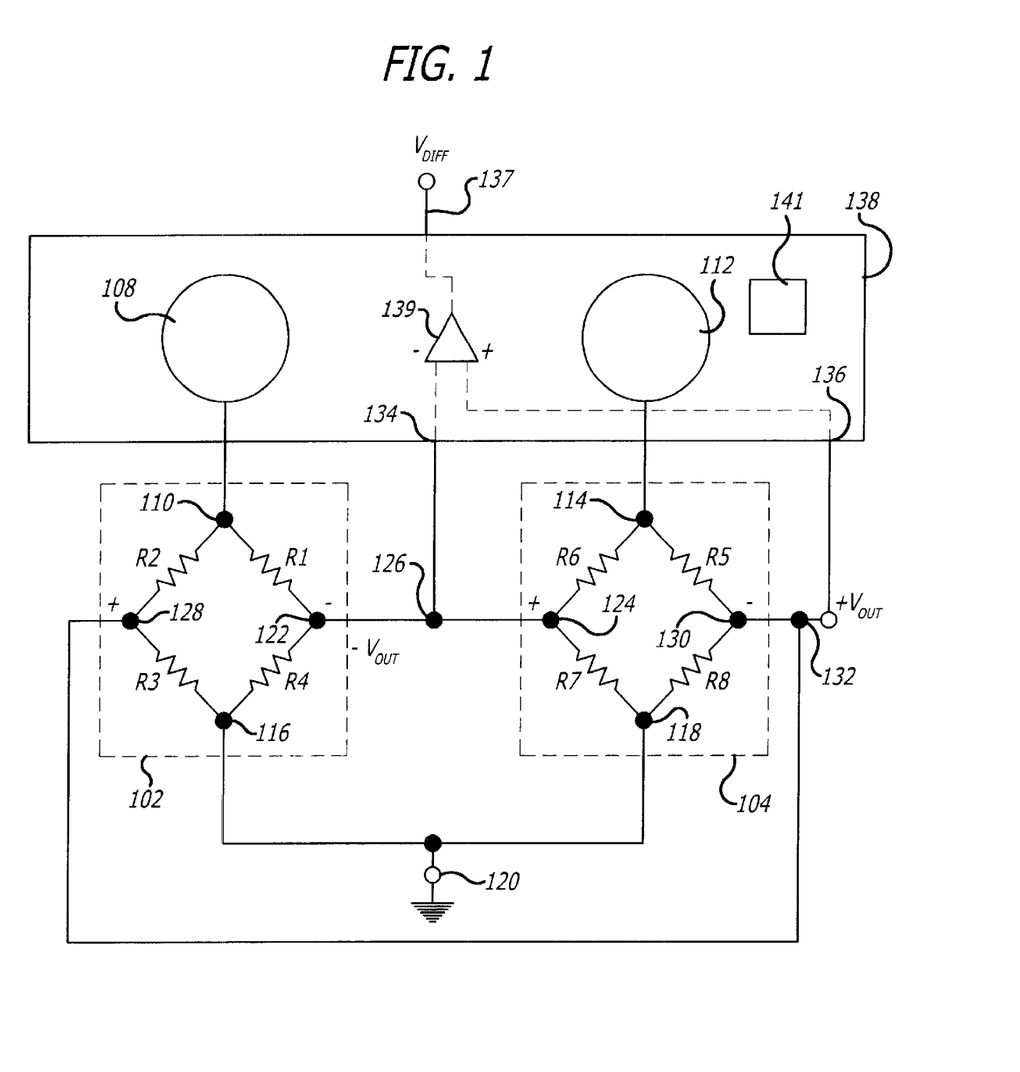
FIG. 1 is an electrical schematic diagram illustrating the electrical connections of two Wheatstone Bridge pressure sensors for implementing an embodiment of the independent-excitation cross-coupled differential-pressure transducer of the present invention.

FIG. 1 is an electrical schematic diagram illustrating the electrical connections of two Wheatstone Bridge pressure sensors 102 and 104 for implementing an embodiment of the independent-excitation cross-coupled differential-pressure transducer 106 (see FIG. 3) of the present invention. When used in the differential-pressure transducer 106, the pressure sensor 102 can be used to measure a high pressure while the pressure sensor 104 can be used to measure a low, or reference pressure.

Resistors $R_1$, $R_2$, $R_3$, and $R_4$ form a first Wheatstone Bridge that comprises the high pressure sensor 102. Resistors $R_5$, $R_6$, $R_7$, and $R_8$ form a second Wheatstone Bridge that comprises the reference pressure sensor 104. A voltage or current excitation source 108 for the sensor 102 is provided at an input node 110. Another voltage or current excitation source 112 for the sensor 104 is provided at an input node 114. In a preferred embodiment, the sources 108, 112 provide independent voltage excitations to the sensors 102, 104 and are supplied from a signal conditioner network 138. As is known in the art, signal conditioner networks serve to process a signal so as to make it compatible with a given device. Conditioning operations can include filtering, amplification, isolation, integration, differentiation, and rectification, for example. One skilled in the art will appreciate that although particular polarities of the power supplies and output signals are illustrated in FIG. 1, the circuit functions in the same manner if all of the polarities are reversed. Nodes 116 and 118 are coupled, through a node 120, to a reference voltage, which is typically ground. Nodes 122 and 124 are coupled together to provide a $-V_{out}$ output at node 126. Nodes 128 and 130 are connected together at node 132 to provide a $+V_{out}$ output. As is evident from FIG. 1, the Wheatstone Bridges that comprise sensors 102, 104 are connected in a cross-coupled fashion. That is, for the polarities of voltages illustrated, the positive output node 128 and the negative output node 132 are connected together and the negative output node 122 and the positive output node 124 are connected together. The $-V_{out}$ and $+V_{out}$ outputs of the nodes 126, 132 are electrically connected to the signal conditioner network 138 at signal conditioner network inputs 134, 136, respectively. The signal conditioner network 138 can include a differential amplifier 139 and the $-V_{out}$ and $+V_{out}$ outputs of the nodes 126, 132 can be connected to the negative and positive inputs of the differential amplifier to provide a high level amplified differential measurement of the pressure outputs. The differential output can be output as a differential voltage $V_{diff}$ at an output 137 of the signal conditioner network 138.

The excitation sources 108, 112 are controlled by the signal conditioner network 138. The signal conditioner network 138 can adjust the voltages from excitation sources 108, 112 based on the $-V_{out}$ and $+V_{out}$ output signals of the nodes 126, 132. The signal conditioner network 138, excitation sources 108, 112 and differential amplifier 137 and signal conditioner network 138 can all be implemented on a single or on multiple ASIC chips.

For a differential pressure transducer to work properly, the slopes of the output voltage versus measured pressure curves for each pressure sensor should substantially match. These slopes represent the sensitivity of the pressure sensors. In U.S. Pat. No. 6,023,978 to Dauenhauer et al, the sensitivities are matched by choosing sensor die that have been formed adjacent or next to each other on the wafer. In the present invention, the sensitivities of the sensors 102, 104 are matched by independently adjusting the voltages supplied by the excitation sources 108, 112, respectively.

Figure 2A:
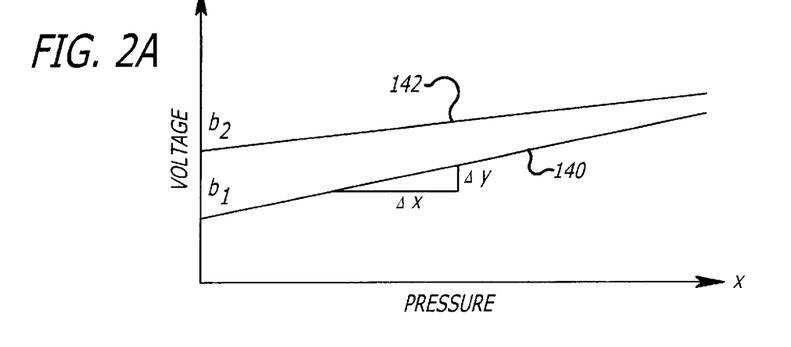
FIGS. 2A, 2B, 2C are curves representing the output voltage versus detected pressure for the high and reference pressure sensors.

The principal of sensitivity (slope) and offset correction in the present invention is explained with reference to FIGS. 2a, 2b, 2c. The equation of the output voltage versus detected pressure for the high pressure sensor 102 is illustrated by a curve 140 in FIG. 2a and is described by the equation:

$$V_1 = b_1 + m_1 P_1$$

where $V_1$ is the output voltage at the node 110 and is measured along the y-axis. $P_1$ is the pressure to be measured and is measured along the x-axis. FIG. 2a also illustrates the offset voltage $b_1$ where the curve 140 intercepts the y-axis. The slope $m_1$ of the curve 140 represents the sensitivity of the high pressure sensor 102 and is illustrated by $\Delta y/\Delta x$ in FIG. 2a. The equation of the output voltage versus detected pressure for the reference pressure sensor 102 is illustrated by a curve 142 in FIG. 2a and is described by the equation:

$$V_2 = b_2 + m_2 P_2$$

where $V_2$ is the output voltage at the node 114, $P_2$ is pressure to be measured, $b_2$ is the offset voltage and $m_2$ is the slope. The resulting differential output is then:

$$V_1 - V_2 = (b_1 - b_2) + (m_1 P_1 - m_2 P_2)$$

Figure 2B:
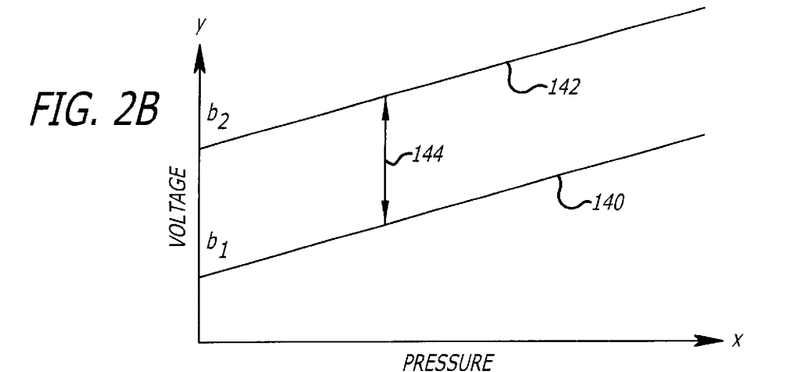
Figure 2C:
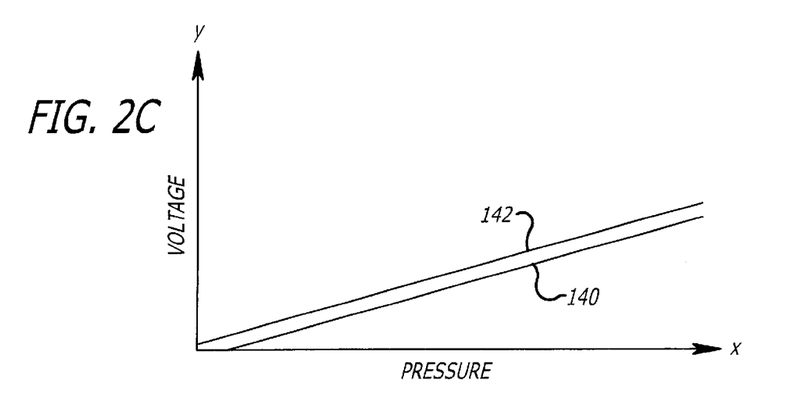

The signal conditioner network 138 controls the excitation sources 108, 112 to independently adjust the slopes of the curves 140, 142 to substantially match ($m_1 \approx m_2 \approx m$), as illustrated in FIG. 2b. The differential output then becomes:

$$V_1 - V_2 = (b_1 - b_2) + m(P_1 - P_2)$$

Here, "b1−b2" is the induced offset pressure error or static line pressure error 144 of the curves 140, 142. Independently changing the excitations simultaneously changes the offset between the pressure sensors 102, 104. This causes static line pressure errors as the pressure changes. The electronic circuit at the output nodes 122, 124, 128, 130 needs the ability to correct the induced offset to properly calibrate the differential sensing system. When large excitations are needed to match the sensitivities of the pressure sensors 102, 104, the offset difference error can exceed the circuit's correction ability.

The present invention cross-couples the pressure sensors 102, 104 to minimize the offset difference errors and cancel noise when using separate excitation sources. This cross-coupling of the fully active Wheatstone Bridges also doubles the sensitivity of the system, thus requiring less amplification of the differential signal resulting in less noise. As illustrated in FIG. 2c, the offset difference errors between the curves 140, 142 have been substantially eliminated and the equation for the differential output voltage becomes:

$$V_1 - V_2 = m(P_1 - P_2)$$

Thus, the differential output voltage $V_{diff}$ of the two sensors 102, 104 at the output 137 is directly proportional to the difference between the high pressure and the reference pressure.

The sensitivities and offsets of the pressure sensors 102, 104 should also be matched over a range of operating temperatures. The signal conditioner network 138 modulates the excitation voltages applied by the excitation sources 108, 112 to the input nodes 110, 114 to substantially match the sensitivities of the pressure sensors 102, 104, over a range of operating temperatures. Ambient temperature is measured by circuitry 141 of the signal conditioner network 138. The conditioner 138 then injects first and higher-order error-correcting signals to compensate the offset and span signal errors of each of the sensors 102, 104.

Figure 3:
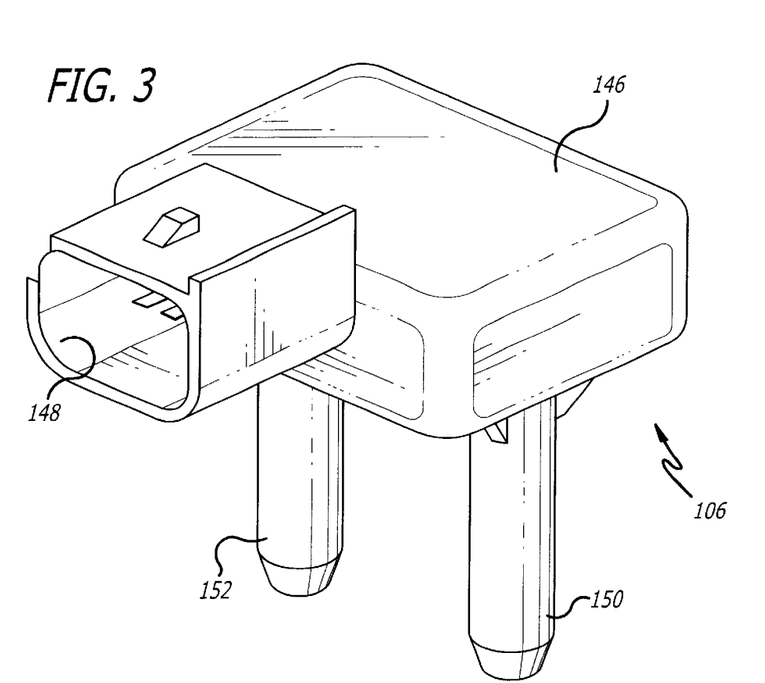
FIG. 3 is a perspective view of the cross-coupled differential-pressure transducer of the present invention.

FIG. 3 is a perspective view of the cross-coupled differential-pressure transducer 106 of the present invention. The system 106 is enclosed in a housing 146. Electrical connections to the system are made through an opening formed by walls 148. The system has a high-pressure intake 150 and a low-pressure intake 152 extending outwardly from the housing. The intakes 150, 152 can be nozzles as illustrated in FIG. 3, or other suitable intake structures.

Figure 8:
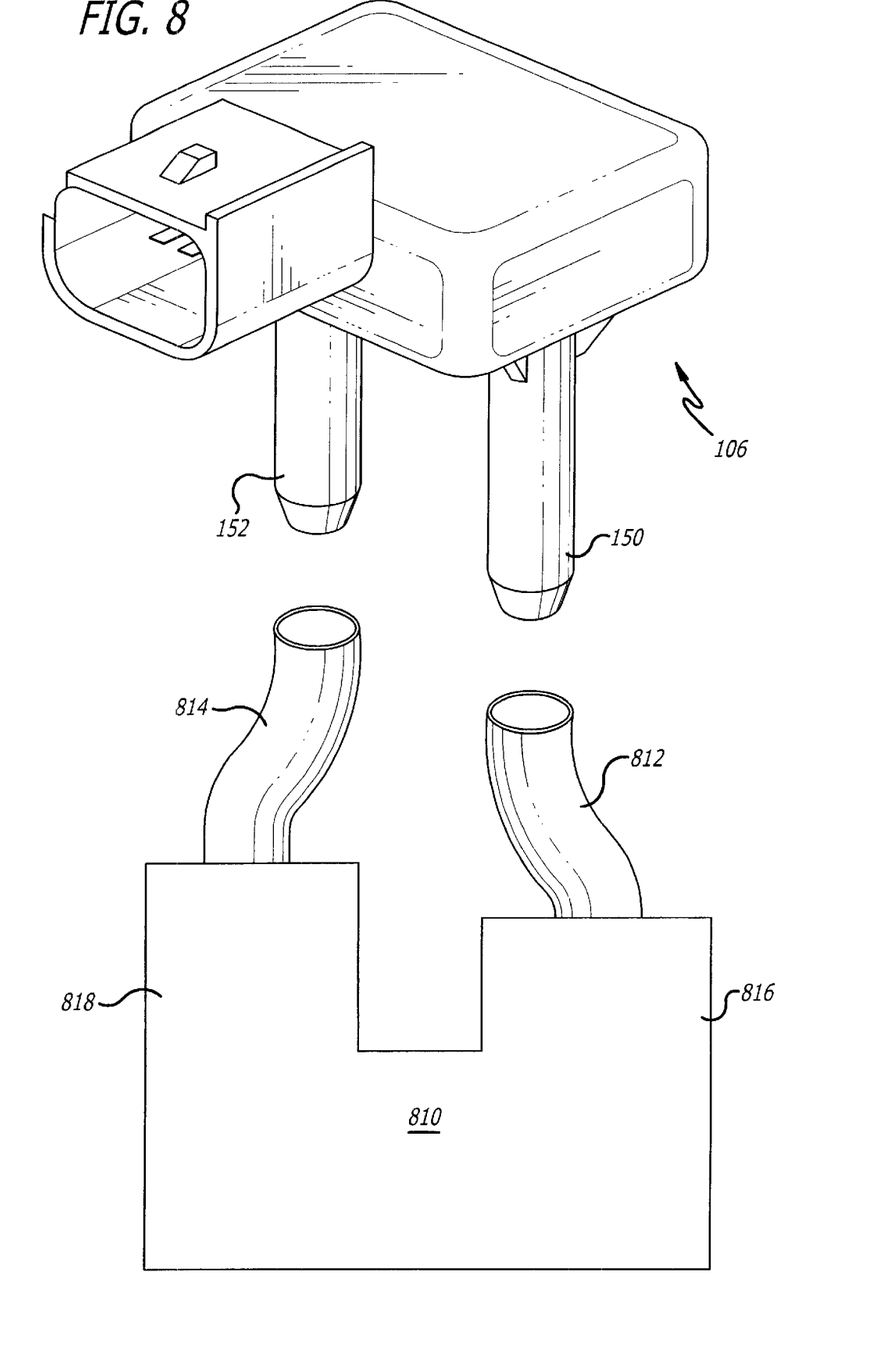
FIG. 8 is a semi-diagrammatic perspective view of an engine exhaust system using the cross-coupled differential-pressure transducer of the present invention.

In one application, illustrated in FIG. 8, the system 106 is used in an automobile engine for measuring differential pressure in the exhaust system 810. The high pressure intake 150 can be connected via a hose or conduit 812 to measure the pressure at the engine's exhaust manifold 816 while the low pressure intake 152 can be connected via a conduit 814 to measure the pressure at the engine's intake manifold 818. The exhaust manifold 816 typically provides a pressure of between 0–19 psi to the high-pressure intake 150 while the intake manifold 818 typically provides a pressure of between 0–15 psi to the low-pressure intake 152. This measurement is necessary for the exhaust gas recirculation valve (EGR).

Figure 4:
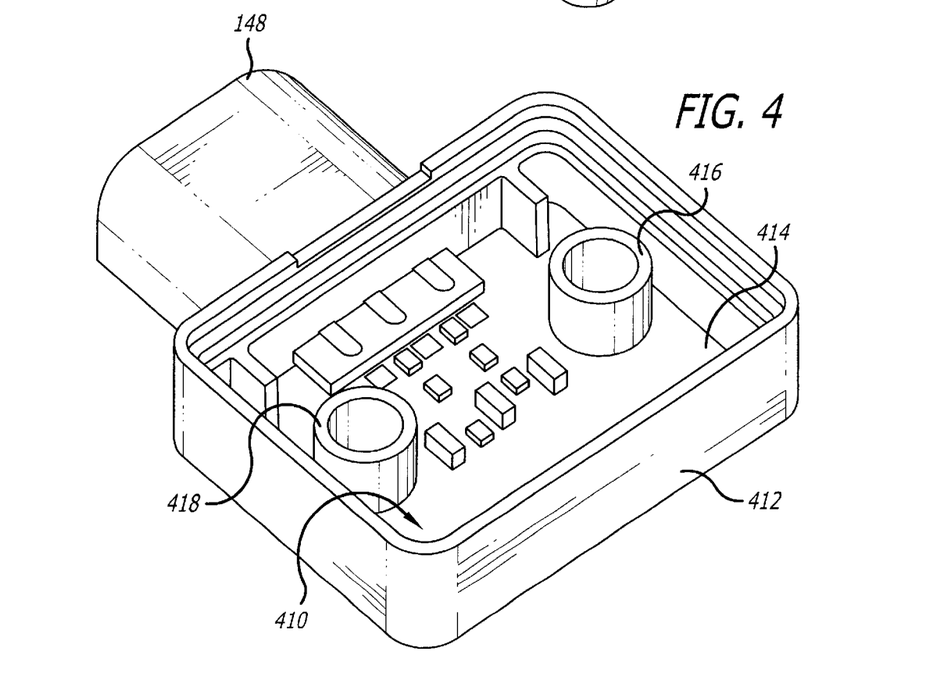
FIG. 4 is a perspective view of a hybrid assembly resting in a top portion of the housing of the transducer of FIG. 3.

FIG. 4 is a perspective view of a hybrid assembly 410 resting in a top portion 412 of the housing 146. The hybrid assembly 410 can be arranged on a ceramic substrate 414. Chimneys 416, 418 are bonded to the substrate 414 to form a substantially fluid-tight connection. The chimneys are preferably ceramic, but can be made of other materials as well. The chimneys 416, 418 can be substantially cylindrical as illustrated in FIG. 4, or can have other shapes.

Figure 5:
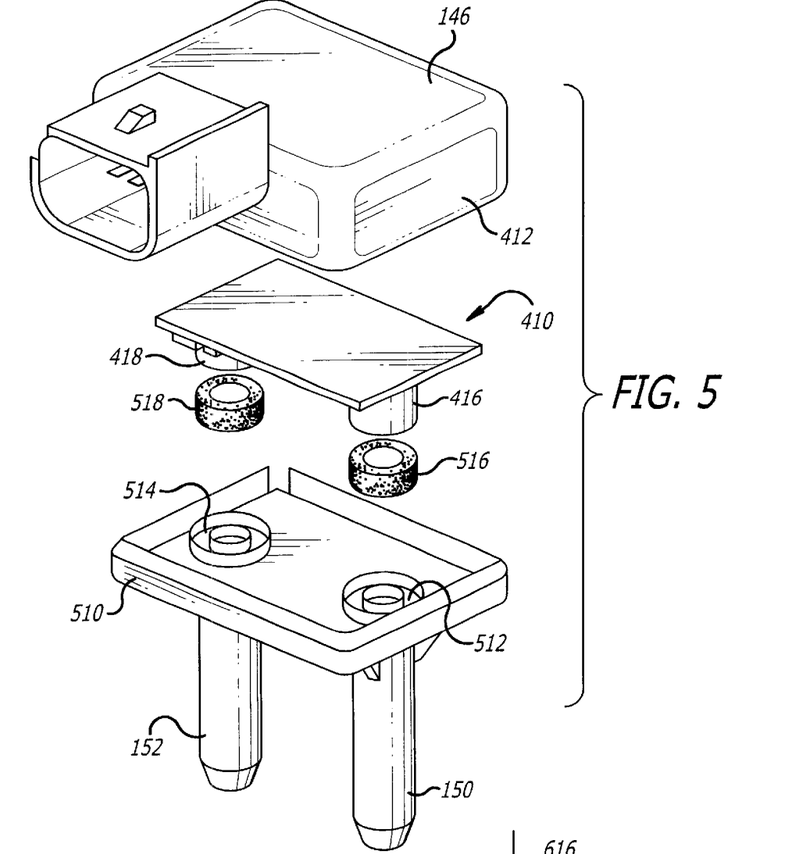
FIG. 5 is an exploded perspective view of the transducer of FIG. 3.

FIG. 5 is an exploded perspective view of the cross-coupled differential-pressure transducer 106. Formed in a lower housing portion 510 are grooves 512, 514. Gaskets 516, 518 fit between the chimneys 416, 418 and the grooves 512, 514 to form a substantially fluid-tight seal between the chimneys 416, 418 and the intakes 150, 152. The hybrid assembly 410 is secured to the top portion of the housing 412 and the top portion of the housing 412 is sealed to the lower housing portion 510 to provide a substantially fluid-tight connection. In the present application, fluid-tight is used to mean substantially impermeable by a fluid. In some applications the fluid is a gas while in others the fluid is a liquid. Thus, when the housing 146 is assembled, the space within the chimneys 416, 418 is open to the outside of the housing 146 through the intakes 150, 152. The parts of the hybrid assembly 410 outside the chimneys 416, 418 are sealed within the housing 412, 510, isolated from the surroundings.

Figure 6:
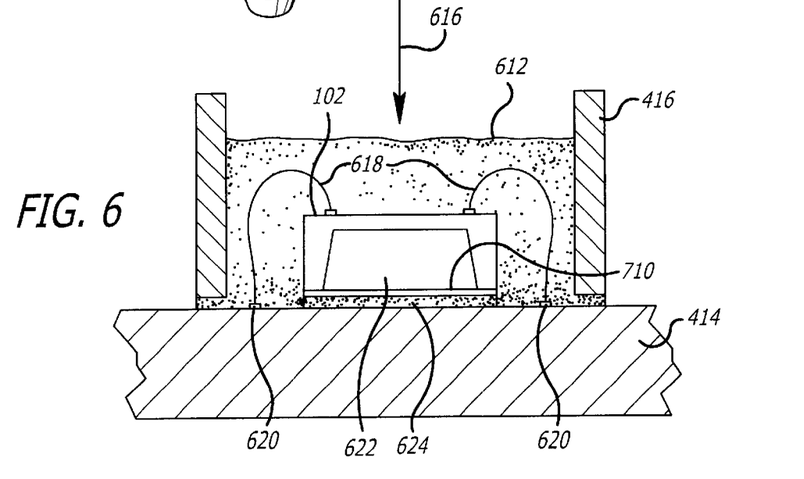
FIG. 6 is a semi-diagrammatic cross-sectional view of a portion of the hybrid assembly showing a chimney with a pressure sensor mounted inside.
Figure 7:
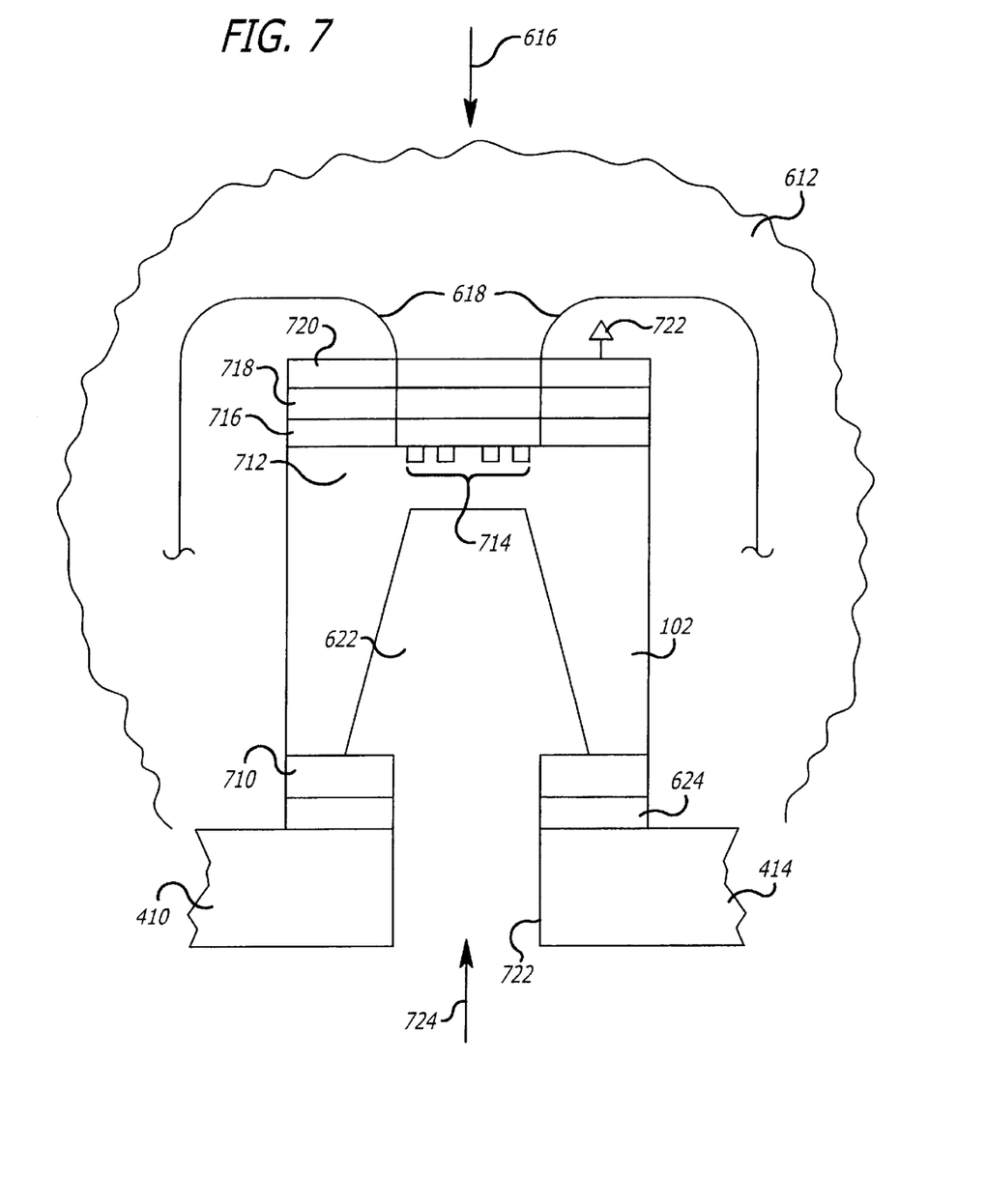
FIG. 7 is a semi-diagrammatic cross-sectional view also showing the structure of the pressure sensor mounted on the hybrid assembly.

FIG. 6 is a semi-diagrammatic cross-sectional view of a portion of the hybrid assembly 410 showing one of the chimneys 416 with one of the pressure sensors 102 mounted inside. FIG. 7 is a more detailed semi-diagrammatic cross-sectional view also showing the structure of the pressure sensor 102 mounted on the hybrid assembly 410. It should be noted that each of the sensors 102, 104 are similarly mounted, and thus the descriptions with respect the mounting of sensor 102 illustrated in FIGS. 6 and 7 apply equally to the mounting of sensor 104.

The configurations illustrated in FIGS. 6 and 7 differ in that FIG. 7 illustrates an embodiment in which a hole passes through the substrate 414 into a chamber 622, while in FIG. 6 the chamber 622 is partially evacuated and sealed. The configuration of FIG. 6 is used to provide a differential pressure measurement of the pressures supplied through the intakes 150, 152 to the pressure sensors 102, 104, respectively. A differential pressure measurement based on four different pressures is provided since, in general, different pressures are supplied through the intakes 150, 152 and the partially evacuated and sealed chambers 622 of each sensor 102, 104 have slightly different pressures, typically in the range of between 0–½ psi. Of course, the pressures in the chamber 622 of the pressure sensors 102, 104 can be substantially the same. Also, at times the intakes 150, 152 can supply pressures substantially the same which will result in a differential pressure of substantially zero. The configuration of FIG. 6 is advantageous in that it isolates the chamber 622 from outside contaminants and from water vapor.

The configuration of FIG. 7 is used in a gauge differential pressure configuration. In the gauge differential pressure configuration, a hole formed by walls 722 passes through the substrate 414 into the chamber 622. The same reference pressure 724, typically atmospheric pressure, is provided to the chambers of each of the pressure sensors 102, 104. Thus an additional inlet can pass through the housing 146 to provide atmospheric pressure to the chamber 622. In this open configuration, water vapor can freely enter the chamber 622. If the working environment of the system 106 becomes very cold, the water vapor can freeze, pushing on the insides of the chamber 622. Such pushing can lead to cracking of the pressure sensors 102, 104 or breaking away from the substrate 414. This problem can be prevented by making the holes passing into the chamber 622 of the sensors 102, 104 sufficiently large. By making the holes sufficiently large, the ice formed from the water vapor does not have as much surface to push against, resulting in significantly less pushing force against the chamber walls of the sensors 102, 104.

FIGS. 6 and 7 both show the sensor 102 surrounded by gel 612. The gel 612 protects the pressure sensors 102, 104 from contaminants introduced through the intakes 150, 152. Here "gel" is defined as a colloidal suspension of a liquid in a solid, forming a jellylike material in a more solid form than a solution. The gel is specially selected to accurately transmit pressure 616 while isolating the pressure sensor electronics from harsh surrounding conditions. The gel can be, for example, Shin-Etsu, which stays soft over the −40 Celsius to 135 Celsius temperature range and does not exert extra pressure on the sensor. In some applications, for example when relatively clean gas is being measured for pressure, or when the pressure measuring system is to be used only temporarily and then discarded, the gel can be disposed of and the pressure sensor can be exposed directly to the gas rather than being exposed to the gas through the gel.

The pressure sensor 102 can be mounted to the substrate 414 using a rubber adhesive layer 624. The other chimney 418 has the pressure sensor 104 similarly situated within. Wirebonds 618 electrically connect the pressure sensors 102, 104 to traces 620 on the substrate 414 and carry a relatively high voltage. The pressure sensor 102 illustrated in FIGS. 6 and 7 is not drawn to scale. In particular, the chamber 622 is drawn to a greatly exaggerated scale relative to the pressure sensor 102.

The pressure sensors 102, 104 can be made of silicon as is known in the art. Alternatively, the sensors can be have thin-film, foil gauge or bulk silicon gauge designs. A thin diaphragm 712 is formed in the pressure sensor 102. Several resistances 714, corresponding to the resistances R1–R4 illustrated in FIG. 1, are formed by injecting, for example, boron into the silicon of the diaphragm 712. A PYREX cap 710 of borosilicate glass with a low coefficient of thermal expansion, and high chemical, heat shock, and thermal resistance is electrostatically bonded to the pressure sensor 102. Materials other than PYREX can also be used. The chamber 622 is formed by the cap 710 sealed to the pressure sensor 102. In the embodiment illustrated in FIG. 6, it is the cap 710 sealed to the pressure sensor 102 which forms the partially evacuated and sealed chamber 622. In the embodiment illustrated in FIG. 7, the hole formed by the walls 722 passes through the substrate 414, the rubber adhesive layer 624, and the cap 710. The cap 710 attaches the pressure sensor 102 to the substrate 414 by way of the rubber adhesive layer 624. At the end of the pressure sensor 102 opposite the cap 710 is the thin diaphragm 712. A silicon dioxide ($SiO_2$) layer 716 covers the diaphragm 712 and the resistances 714. Covering the silicon dioxide layer 716 is a silicon nitride layer 718, which is fairly impervious to contaminants passing through, for protecting the resistances 714 from contamination.

The resistances 714 can have their values changed by contaminants. For example, ions from the electrostatic bonding region between the sensor 102 and the cap 710 can travel through the gel 612 to the region between the diaphragm 712 and the silicon dioxide layer 716. The ions then combine with the boron doped silicon to change the value of the resistances 714. This problem can be prevented by covering the silicon nitride layer 718 with an aluminum layer 720. The aluminum layer 720 is connected to a high potential 722 which prevents the ions from migrating to the boron injected silicon region.

While the specification describes particular embodiments of the present invention, those of ordinary skill can devise variations of the present invention without departing from the inventive concept.

I claim:

1. A pressure transducer comprising:

a first pressure sensor having a first sensitivity and excited by a first voltage;

a second pressure sensor having a second sensitivity different from the first sensitivity and excited by a second voltage different from said first voltage, and wherein:

the first and second voltages are independently adjustable to increase or decrease the sensitivities of the first and second sensors to substantially match each other; the outputs of the sensors are cross-coupled to each other to reduce the offset difference errors between the pressure sensors.

2. The pressure transducer of claim 1, wherein the first and second voltages are adjusted to substantially match the sensitivities of the first and second sensors over a range of pressures and temperatures.

3. The pressure transducer of claim 1, wherein the first and second voltages are independently adjustable to increase the sensitivity of the first sensor and to decrease the sensitivity of the second sensor to substantially match each other.

4. The pressure transducer of claim 1, wherein:

the first and second pressure sensors are Wheatstone Bridge pressure sensors.

5. The pressure transducer of claim 1 wherein the first and second sensors each has a positive and negative output node and the sensors are cross-coupled by electrically connecting the positive output node of the first sensor to the negative output node of the second sensor and the negative output node of the first sensor to the positive output node of the second sensor.

6. The pressure transducer of claim 1, further comprising:

a differential amplifier; and wherein the first pressure sensor measures a high pressure and the second pressure measures a reference pressure, of lower pressure than the high pressure; and one output from the sensors is electrically connected to a positive input of the differential amplifier and another output from the sensors is electrically connected to a negative input of the differential amplifier to produce a differential pressure measurement of the high and reference pressures.

7. The pressure transducer of claim 1, wherein the first and second voltages are adjusted according to the outputs of the sensors.

8. The pressure transducer of claim 1, wherein the first and second voltages are adjusted to compensate for changing temperature.

9. The pressure transducer of claim 1, wherein the first and second voltages are provided by first and second excitation sources controlled by a signal conditioner network, the signal conditioner network adjusting the voltages based on inputs from the sensors to substantially match the sensitivities of the first and second pressure sensors over a range of pressures and temperatures.

10. The pressure transducer of claim 1, wherein:

the first sensor includes a first diaphragm exposed on one side and having a sealed partially evacuated chamber on the other side of the first diaphragm, said first sensor providing an output signal proportional to the difference between a first pressure applied across the exposed side of the first diaphragm and a second pressure applied across the chamber side of the first diaphragm; and the second sensor includes a second diaphragm exposed on one side and having a sealed partially evacuated chamber on the other side of the second diaphragm, said second sensor providing an output signal proportional to the difference between a third pressure applied across the exposed side of the first diaphragm and a fourth pressure applied across the chamber side of the first diaphragm.

11. The pressure transducer of claim 1, wherein:

the first sensor includes a first diaphragm exposed on one side and having a chamber on the other side of the first diaphragm, said first sensor providing an output signal proportional to the difference between a first pressure applied across the exposed side of the first diaphragm and an atmospheric pressure applied across the chamber side of the first diaphragm; and the second sensor includes a second diaphragm exposed on one side and having a chamber on the other side of the second diaphragm, said second sensor providing an output signal proportional to the difference between a third pressure applied across the exposed side of the second diaphragm and the atmospheric pressure applied across the chamber side of the second diaphragm.

12. The pressure transducer of claim 1, wherein:

the first sensor is fixed relative to a first substrate section and is within a first chimney having a substantially fluid-tight attachment to the first substrate section; and the second sensor is fixed relative to a second substrate section and is within a second chimney having a substantially fluid-tight attachment to the second substrate section.

13. The pressure transducer of claim 4, wherein:

the first and second pressure sensors include first and second diaphragm covered chambers;

the Wheatstone Bridges comprise resistances formed by injecting boron into the diaphragms;

the outputs of the sensors are produced by movements of the diaphragms responsive to pressure differences on each side of the first and second diaphragms.

14. The pressure transducer of claim 13 further comprising:

a voltage biased metallic layer formed over the resistances to prevent ion contaminants from combining with the resistances and changing the resistive values.

15. The pressure transducer of claim 8, further comprising a signal conditioner including temperature measuring circuitry and wherein: ambient temperature is measured by the circuitry of the signal conditioner and, in response to the measured ambient temperature, the conditioner injects first and higher-order error-correcting signals to compensate offset and sensitivity signal errors of each of the sensors.

16. The pressure transducer of claim 10, wherein:

all four pressures are different from each other.

17. The pressure transducer of claim 11, wherein:

the first and second sensors have substantially fluid-tight attachments to the substrate sections with walls forming holes passing through each of the substrate sections and into the first and second chambers; and said walls are disposed to form holes having a diameter large enough to prevent ice formed in the chamber from exerting significant force on the walls of the chamber.

18. The pressure transducer of claim 17, further comprising:
a housing;
first and second intakes;
wherein a substantially fluid-tight path is formed between the first intake and the first chimney such that a first fluid path exists from the first intake to the first chimney, and a substantially fluid-tight path is formed between the second intake and the second chimney such that a second fluid path exists from the second intake to the second chimney; and
wherein the first and second chimneys form a substantially fluid-tight space within the housing.

19. A method for matching the output characteristics of a first and a second pressure sensor comprising the steps of:
applying a first excitation to the first pressure sensor;
applying a second excitation different than said first excitation to the second pressure sensor;
independently adjusting the first and second excitations to increase or decrease the sensitivities of the first and second sensors to substantially match each other; and
cross-coupling the outputs of the sensors to reduce the offset difference errors between the pressure sensors.

20. The method of claim 19, wherein the step of adjusting the first and second excitations includes increasing the first excitation and decreasing the second excitation so that they substantially match each other.

21. The method of claim 19, wherein the step of cross-coupling the outputs includes electrically connecting a positive output node of the first sensor to a negative output node of the second sensor and electrically connecting the negative output node of the first sensor to the positive output node of the second sensor.

22. The method of claim 19, wherein the step of independently adjusting the first and second excitations includes the step of adjusting the first and second voltages to substantially match the sensitivities of the first and second sensors over a range of pressures and temperatures.

23. The method of claim 19, wherein the step of independently adjusting the first and second excitations includes the step of adjusting the first and second voltages based on inputs from the sensors provided to a signal conditioner network to substantially match the sensitivities of the first and second pressure sensors over a range of pressures and temperatures.

24. A pressure measuring means comprising:
a first pressure sensor having a first sensitivity;
a second pressure sensor having a second sensitivity different than the first sensitivity;
a first excitement means for exciting the first pressure sensor at a first excitement level;
a second excitement means for exciting the second pressure sensor at a second excitement level different than the first excitement, the first and second excitement means independently adjustable to increase or decrease the sensitivities of the first and second sensors to substantially match each other; and
means for cross-coupling the outputs of the sensors to reduce the offset difference errors between the pressure sensors.

25. A pressure transducer apparatus comprising:
a housing having a first pressure intake and a second pressure intake, each intake extending outwardly from the housing;
a first pressure chamber and a second pressure chamber, the first pressure chamber coupled to the first pressure intake and housing a first pressure sensor having a first sensitivity and excited by a first voltage, and the second pressure chamber coupled to the second pressure intake and housing a second pressure sensor having a second sensitivity different from the first sensitivity and excited by a second voltage different from said first voltage, wherein the first and second voltages are independently adjustable to increase or decrease the sensitivities of the first and second sensors to substantially match each other, and wherein the outputs of the first and second pressure sensors are cross-coupled to each other to reduce offset difference errors between the first and second pressure sensors; and
a substrate positioned with the housing, the first and second pressure sensors being mounted on the substrate, wherein the first and second pressure chambers are bonded to the substrate.

* * * * *